United States Patent
Yoon et al.

(10) Patent No.: US 11,300,964 B2
(45) Date of Patent: Apr. 12, 2022

(54) METHOD AND SYSTEM FOR UPDATING OCCUPANCY MAP FOR A ROBOTIC SYSTEM

(71) Applicant: KOREA ADVANCED INSTITUTE OF SCIENCE AND TECHNOLOGY, Daejeon (KR)

(72) Inventors: Sung-Eui Yoon, Daejeon (KR); Youngsun Kwon, Daejeon (KR); Donghyuk Kim, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 449 days.

(21) Appl. No.: 15/817,421

(22) Filed: Nov. 20, 2017

(65) Prior Publication Data

US 2018/0173239 A1     Jun. 21, 2018

(30) Foreign Application Priority Data

Dec. 20, 2016  (KR) .................. 10-2016-0174452
Sep. 22, 2017  (KR) .................. 10-2017-0122381

(51) Int. Cl.
*G01S 17/89*     (2020.01)
*B25J 9/16*      (2006.01)
(Continued)

(52) U.S. Cl.
CPC .......... *G05D 1/0214* (2013.01); *B25J 9/1664* (2013.01); *G01S 7/4808* (2013.01);
(Continued)

(58) Field of Classification Search
CPC .................................................... G05D 1/0214
See application file for complete search history.

(56) References Cited

U.S. PATENT DOCUMENTS 8,169,434 B2 *   5/2012  Zhou ................... G06F 16/9027
                                              345/419
8,587,583 B2 *  11/2013  Newcombe ............ G06T 17/00
                                              345/420
(Continued)

FOREIGN PATENT DOCUMENTS

KR     1020110092592 A     8/2011

OTHER PUBLICATIONS

Hornung, A., Wurm, K.M., Bennewitz, M. et al. OctoMap: an efficient probabilistic 3D mapping framework based on octrees. Auton Robot 34, 189-206 (2013). https://doi.org/10.1007/s10514-012-9321-0 (Year: 2013).*

(Continued)

*Primary Examiner* — David Orange
(74) *Attorney, Agent, or Firm* — Leber IP Law; David C. Robertson

(57) ABSTRACT

A method and system for updates an occupancy map based on a first ray determined from a plurality of rays, as known as a super ray. The method of updating an occupancy map based on grids and octrees includes the step of generating a mapping line based on point clouds obtained from a sensor, determining a super ray by identifying a cell belonging to a plurality of cells forming the occupancy map and traversing an identical cell based on the generated mapping line, and updating the occupancy map by updating a cell through which the super ray corresponding to some of rays related to the plurality of cells forming the occupancy map passes.

24 Claims, 12 Drawing Sheets

(51) Int. Cl.
  *G01S 7/48* (2006.01)
  *G05D 1/02* (2020.01)
(52) U.S. Cl.
  CPC ............ *G01S 17/89* (2013.01); *G05D 1/0231* (2013.01); *Y10S 901/46* (2013.01); *Y10S 901/47* (2013.01)

(56) References Cited

U.S. PATENT DOCUMENTS

| | | | |
|---|---|---|---|
| 8,593,451 | B2 | 11/2013 | Kim et al. |
| 8,705,792 | B2 * | 4/2014 | James ............... G06T 7/246 382/103 |
| 8,723,865 | B1 * | 5/2014 | Jansen ............... G06T 15/06 345/426 |
| 2011/0193859 | A1 | 8/2011 | Kim et al. |
| 2017/0249401 | A1 * | 8/2017 | Eckart ............... G06V 10/955 |
| 2020/0082539 | A1 * | 3/2020 | Hog ............... G06T 7/11 |

OTHER PUBLICATIONS

Youngsun Kwon, Donghyuk Kim and Sung-eui Yoon, "Super ray based updates for occupancy maps," 2016 IEEE International Conference on Robotics and Automation (ICRA), Stockholm, 2016, pp. 4267-4274, doi: 10.1109/ICRA.2016.7487623 (Year: 2016).*

Wurm, Kai M., et al. "OctoMap: A probabilistic, flexible, and compact 3D map representation for robotic systems." Proc. of the ICRA 2010 workshop on best practice in 3D perception and modeling for mobile manipulation. vol. 2. 2010, ais.informatik.uni-freiburg.de/publications/papers/wurm10octomap.pdf (Year: 2010).*

Cotra, Marko, and Michael Leue. Lidar-based methods for tracking and identification. MS thesis. 2016. (Year: 2016).*

Chen, J. and Shen, S., May 2017, Improving octree-based occupancy maps using environment sparsity with application to aerial robot navigation. In 2017 IEEE international conference on robotics and automation (ICRA) (pp. 3656-3663). IEEE. (Year: 2017).*

Hornung, A., Wurm, K.M., Bennewitz, M., Stachniss, C. and Burgard, W., 2013. OctoMap: An efficient probabilistic 3D mapping framework based on octrees. Autonomous robots, 34(3), pp. 189-206. (Year: 2013).*

Wurm, K. M. et al.,"OctoMap: A Probabilistic, Flexible, and Compact 3D Map Representation for Robotic Systems," University of Freiburg, Department of Computer Science.

Moravec, H. P., "Robot Spatial Perception by Stereoscopic Vision and 3D Evidence Grids," The Robotics Institute Carnegie Mellon University, Sep. 1996, 42 pages.

Elfes, Alberto, "Using Occupancy Grids for Mobile Robot Perception and Navigation," Computer, Jun. 1989, pp. 46-57.

Moravec, H. P. et al,"High Resolution Maps from Wide Angle Sonar," The Robotics Institute—Carnegie-Mellon University, pp. 116-121.

Hornung, A. et al., "An Efficient Probabilistic 3D Mapping Framework Based on Octrees," Dec. 2012.

Scholer, F. et al., "Person Tracking in Three-Dimenstional Laser Range Data with Explicit Occlusion Adaption," International Conference on Robotics and Automation Shanghai International Conference Center, May 9-13, 2011.

Kwon, Youngsun et al., "Super Ray based Updates for Occupancy Maps," International Conference on Robotics and Automation, May 16-21, 2016.

English Abstract of KR-1020110092592, Publication Date: Aug. 18, 2011.

* cited by examiner (a) Indoor Dataset (b) Outdoor Dataset

METHOD AND SYSTEM FOR UPDATING OCCUPANCY MAP FOR A ROBOTIC SYSTEM

CROSS REFERENCE TO RELATED APPLICATION

The present application claims the benefit of Korean Patent Application No. 10-2016-0174452 and of Korean Patent Application No. 10-2017-0122381, respectively filed in the Korean Intellectual Property Office on Dec. 20, 2016, and Sep. 22, 2017, the entire contents of which are incorporated herein by reference.

BACKGROUND OF THE INVENTION

1. Technical Field

Embodiments of the present invention relate to a technology for efficiently updating point clouds with occupancy map representations, such as octrees, and, more particularly, to a technology for updating an occupancy map using a mapping line based on a characteristic in that edge or grid points branch out the access pattern of updating the map.

2. Description of the Related Art

Many robotic systems use various sensor data for understanding their environments. Point clouds have been known as effective representation of the environments around robots, and are easily captured in recently emerging, inexpensive consumer-level depth sensors (e.g., Kinect and Xtion). The point clouds are represented by a large amount of points representing geometric information of environments in high resolution, but have various levels of sensor noise. In applications such as path planning and SLAM, it is difficult to use such point clouds directly because of the sheer amount of generated data itself as well as the noise. In order to solve the problems attributable to the amount of noise and data themselves, a technology for representing an occupancy map based on octrees or grids has been proposed. The following Non-Patent Document [1] Kai M Wurm, Armin Hornung, Maren Bennewitz, Cyrill Stachniss, and Wolfram Burgard, "Octomap: A probabilistic, flexible, and compact 3d map representation for robotic systems", in Proc. of the ICRA 2010 workshop on best practice in 3-D perception and modeling for mobile manipulation, 2010, vol. 2, [2] H Moravec, "Robot spatial perception by stereoscopic vision and 3d evidence grids", Perception, (September), 1996 describes a method of representing point clouds using various occupancy map representations, such as octrees and grids, in order to consider uncertainty of point clouds. A grid map requires a high capacity of memory in order to process large-scale external environments and requires high resolution for accurate map representations.

Recent applications use such map representations to achieve higher performance. For example, path planning algorithms use an occupancy map representing a free or occupied state in each cell in order to efficiently find a collision-free path instead of accessing large and uncertain point clouds.

However, constructing occupancy maps out of point clouds may take high computation overhead. Especially, a huge amount of time is taken to traverse and update the maps if the maps are used in high resolution in order to obtain high precision. Furthermore, if the resolution of the maps is lowered, performance is improved, but it may result in a serious problem in various robotic operations, such as motion planning, because accuracy is lowered.

Accordingly, there is a need for a technology for updating an occupancy map representing point clouds in order to achieve higher performance while not damaging accuracy of the map. Korean Patent Application Publication No. 10-2011-0092592 relates to an apparatus and method for generating a 3-D map based on octrees and grids, and suggests a technology for generating a 3-D map by detecting a plurality of points having 3-D position information and representing the space including the plurality of detected points as an occupancy map based on octrees and grids.

PRIOR ART DOCUMENT

Non-Patent Document

[1] Kai M Wurm, Armin Hornung, Maren Bennewitz, Cyrill Stachniss, and Wolfram Burgard, "Octomap: A probabilistic, flexible, and compact 3d map representation for robotic systems", in Proc. of the ICRA 2010 workshop on best practice in 3-D perception and modeling for mobile manipulation, 2010, vol. 2.

[2] H Moravec, "Robot spatial perception by stereoscopic vision and 3d evidence grids", Perception, (September), 1996.

[3] Alberto Elfes, "Using occupancy grids for mobile robot perception and navigation", Computer, vol. 22, no. 6, pp. 46-57, 1989.

[4] Hans P Moravec and Alberto Elfes, "High resolution maps from wide angle sonar", in Robotics and Automation. Proceedings. 1985 IEEE International Conference on. IEEE, 1985, vol. 2, pp. 116-121.

[5] Armin Hornung, Kai M. Wurm, Maren Bennewitz, Cyrill Stachniss, and Wolfram Burgard, "OctoMap: an efficient probabilistic 3D mapping framework based on octrees", Autonomous Robots, 2013, 34.3: 189-206

SUMMARY OF THE INVENTION

Accordingly, the present invention has been made keeping in mind the above problems occurring in the prior art, and the present invention proposes a technology for updating an occupancy map based on a super ray for sets of point clouds. That is, the present invention proposes a technology for updating point clouds that traverse the same set of cells as a super ray by updating point clouds corresponding to a super ray of a map.

A method of updating an occupancy map based on grids and octrees may include the steps of generating a mapping line based on point clouds obtained from a sensor, generating a super ray by identifying a cell belonging to a plurality of cells forming the occupancy map and traversing the same cell based on the generated mapping line, and updating the occupancy map by updating a cell through which the super ray corresponding to some of rays related to the plurality of cells forming the occupancy map passes.

In accordance with one aspect, the step of generating the mapping line may include the steps of converting a coordinate system of the point clouds into a world coordinate system corresponding to the occupancy map, generating a virtual cell box including all of point clouds belonging to the point clouds whose coordinate system has been converted and corresponding to any one of the plurality of cells forming the occupancy map, and generating a line segment overlapping between the cell box and a slice related to the cell box as the mapping line based on a sensor origin in the occupancy map.

In accordance with another aspect, the step of generating the overlapped line segment as the mapping line may include the steps of determining a plurality of intersection points connecting both end points of the cell box from the sensor origin in a first slice including the sensor origin, determining a grid point located between the determined intersection points, and dividing a seed frustum into a plurality of sub-frustums based on the grid point.

In accordance with yet another aspect, the step of generating the mapping line may include the step of dividing the mapping line into a plurality of segment sections based on any one point of the mapping line which connects to the mapping line through a grid point from a sensor origin in the occupancy map.

In accordance with yet another aspect, the step of generating the super ray may include the steps of determining any one of point clouds respectively located in a plurality of segment sections dividing the mapping line for each segment section and determining a ray projected from a sensor origin to the determined point cloud to be the super ray.

In accordance with yet another aspect, the step of generating the super ray may include the steps of calculating the number of point clouds located in each of the plurality of segment sections for each segment section and setting the number of calculated point clouds as weight of the determined super ray.

In accordance with yet another aspect, the method may further include the step of storing a point cloud corresponding to the super ray instead of a plurality of point clouds corresponding to the same segment section in order to update the occupancy map.

In accordance with yet another aspect, the step of generating the mapping line may include the step of extending a super ray based on a 2-D coordinate system to a 3-D coordinate system base by generating a mapping line for each of an X-Y plane, Y-Z plane and Z-X plane.

In accordance with yet another aspect, the step of generating the super ray may include generating super rays by mapping rays to mapping planes respectively corresponding to the X-Y plane, Y-Z plane and Z-X plane, that is, three mapping planes in the 2-D coordinate system.

In accordance with yet another aspect, the step of generating the super ray may include generating one super ray by grouping rays mapped to each region with respect to the plurality of regions divided by projecting edges within a seed frustum in a 2-D coordinate system onto a mapping plane in a 3-D coordinate system.

In accordance with yet another aspect, rays corresponding to respective point clouds belonging to a segment section corresponding to the super ray may traverse the same cells in the occupancy map.

A system for updating an occupancy map based on grids and octrees may include a mapping line generation unit configured to generate a mapping line based on point clouds obtained from a sensor, a super ray generation unit configured to generate a super ray by identifying a cell belonging to a plurality of cells forming the occupancy map and traversing the same cell based on the generated mapping line, and a map update unit configured to update the occupancy map by updating a cell through which the super ray corresponding to some of rays related to the plurality of cells forming the occupancy map passes.

In accordance with one aspect, the mapping line generation unit may convert a coordinate system of the point clouds into a world coordinate system corresponding to the occupancy map, may generate a virtual cell box including all of point clouds belonging to the point clouds whose coordinate system has been converted and corresponding to any one of the plurality of cells forming the occupancy map, and may generate a line segment overlapping between the cell box and a slice related to the cell box as the mapping line based on a sensor origin in the occupancy map.

In accordance with another aspect, the mapping line generation unit may determine a plurality of intersection points connecting both end points of the cell box from the sensor origin in a first slice including the sensor origin, may determine a grid point located between the determined intersection points, and may divide a seed frustum into a plurality of sub-frustums based on the grid point.

In accordance with yet another aspect, the mapping line generation unit may divide the mapping line into a plurality of segment sections based on any one point of the mapping line which connects to the mapping line through a grid point from a sensor origin in the occupancy map.

In accordance with yet another aspect, the super ray generation unit may determine any one of point clouds respectively located in a plurality of segment sections dividing the mapping line for each segment section, and may determine a ray projected from a sensor origin to the determined point cloud to be the super ray.

In accordance with yet another aspect, the super ray generation unit may calculate the number of point clouds located in each of the plurality of segment sections for each segment section, and may set the number of calculated point clouds as weight of the determined super ray.

In accordance with yet another aspect, the system may further include a storage unit configured to store a point cloud corresponding to the super ray instead of a plurality of point clouds corresponding to the same segment section in order to update the occupancy map.

In accordance with yet another aspect, the mapping line generation unit may extend a super ray based on a 2-D coordinate system to a 3-D coordinate system base by generating a mapping line for each of an X-Y plane, Y-Z plane and Z-X plane.

In accordance with yet another aspect, the super ray extended based on the 3-D coordinate system may include a super ray generated by mapping rays to mapping planes respectively corresponding to the X-Y plane, Y-Z plane and Z-X plane, that is, three mapping planes in the 2-D coordinate system.

In accordance with yet another aspect, the super ray generation unit may generate one super ray by grouping rays mapped to each region with respect to the plurality of regions divided by projecting edges within a seed frustum in a 2-D coordinate system onto a mapping plane in a 3-D coordinate system.

In accordance with yet another aspect, rays corresponding to respective point clouds belonging to a segment section corresponding to the super ray may traverse the same cells in the occupancy map.

A computer program which is coupled to an electronic device implemented by a computer and in which a recording medium has been stored in order to execute a method of updating an occupancy map based on grids and octrees. The method may include the steps of generating a mapping line based on point clouds obtained from a sensor, generating a super ray by identifying a cell belonging to a plurality of cells forming the occupancy map and traversing the same cell based on the generated mapping line, and updating the occupancy map by updating a cell through which the super ray corresponding to some of rays related to the plurality of cells forming the occupancy map passes.

DETAILED DESCRIPTION

Figure 1:
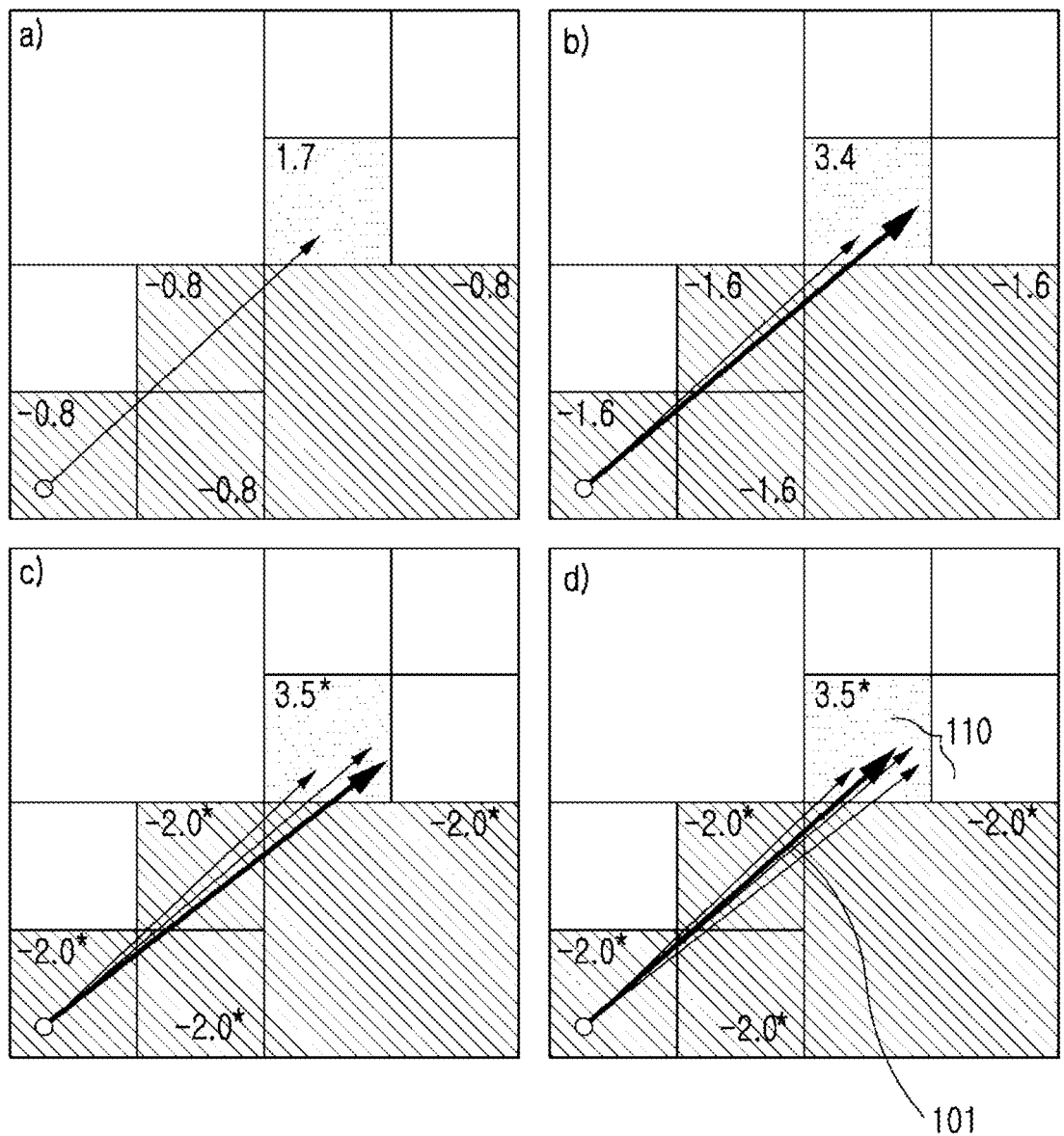
FIG. 1 is a diagram showing octree map representations of four different rays having different end points in accordance with an embodiment of the present invention.

Hereinafter, embodiments of the present invention are described in detail with reference to the accompanying drawings.

The present embodiments relate to a technology for updating an occupancy map based on a super ray, that is, a new concept. More particularly, the present embodiments relate to a technology for updating an occupancy map using a super ray of rays that always traverse the same space instead of updating the occupancy map by individually processing the space (i.e., cell) through which all of rays pass in updating point clouds on the occupancy map based on grids. That is, the present embodiments relate to a technology for improving the update speed of an occupancy map by performing update using a super ray while maintaining representation accuracy of an occupancy map generated using an existing method without any change by reducing the number of accesses to the space of the occupancy map in which point clouds are updated.

In the present embodiments, a "super ray" may indicate a ray that represents rays always traversing the same space (i.e., the same cell) in an occupancy map based on grids. That is, a super ray may be used to update occupancy maps at the same time by grouping points that update the same space (i.e., the same cell) in the occupancy map. In other words, the super ray may be used to update the same point as a set of cells accessed during a map update process. For example, when point clouds corresponding to a super ray are updated, point clouds (i.e., the same cell set) corresponding to rays that traverse the same cell as a cell (i.e., grid space) through which the super ray passes in an occupancy map can be updated.

In the present embodiments, "point clouds" may indicate sensor data captured or sensed by a sensor or a laser range finder. Point clouds themselves may be used to represent an occupancy map. In this case, the point clouds may be obtained by the sensor for each frame. Furthermore, when the "point clouds" are obtained by the sensor, that is, when the point clouds are reported by the sensor, it may mean that the space between the sensor origin and a grid point corresponding to the point clouds may be empty. Accordingly, a super ray may be generated through map search in which a task for connecting a ray to the grid point corresponding to the point clouds reported by the sensor using the sensor origin as the start and connecting the rays is performed up to an end point, and an occupancy map may be updated based on the super ray.

In the present embodiments, a system for updating an occupancy map may indicate an electronic device, such as a stationary terminal implemented using a computer or a mobile terminal. For example, the electronic device may include a smartphone, a portable phone, a navigator, a computer, a notebook, a terminal for digital broadcasting, personal digital assistants (PDA), a portable multimedia player (PMP) or a tablet PC.

In the present embodiments, a "mapping line" may be used to configure a super ray based on an input point, that is, point clouds obtained by a sensor. For example, a mapping line may be used to update a 2-D map and may be used to configure a super ray by extending a 2-D map to a 3-D map, such as grids and octrees.

In the present embodiments, a "frustum" may indicate a portion between two planes when a 3-D structure is cut into parallel the corresponding two planes. Furthermore, update may be performed by adding weight corresponding to the number of points that are updated by a super ray and that belong to an occupancy probability.

In the present embodiments, "traverse (or its variants)" may mean a process of discovering that a specific ray reaches an end point via which cell until the specific ray passes from the sensor origin to the end point in an occupancy map divided into a plurality of cells.

In the present embodiments, a "ray" may have two types of state information; an occupancy state and a free state for the space. A sensor reports some objects at a sensed specific point, and thus the end point of a ray may become the occupancy state. In this case, other spaces through which the ray passes may become the free state. The state information, such as the free state or the occupancy state, may be used as important information in applications, such as motion planning. An occupancy map may be represented based on the pieces of information collected by the sensor. In this case, the data collected by the sensor may include various levels of noise. In order to consider such noise, an occupancy probability may be used. The occupancy probability $P(n|z_{1:t})$ may be represented as in Equation 1.

$$P(n \mid z_{1:t}) = 1 - \left[1 + \frac{p(n \mid z_{1:t-1})}{1 - p(n \mid z_{1:t-1})} \frac{p(n \mid z_{t-1})}{1 - p(n \mid z_t)}\right]^{-1} \quad \text{[Equation 1]}$$

In Equation 1, the occupancy probability $P(n|z_{1:t})$ may be calculated based on the occupancy state n of a cell, a sensor measurement value $z_{1:t}$ sensed from the initial time 1 (step 1) to the current time t (step t), and the Bayes rule. Non-Patent Document [3] Alberto Elfes, "*Using occupancy grids for mobile robot perception and navigation*", Computer, vol. 22, no. 6, pp. 46-57, 1989 suggests a method of modeling the occupancy probability using the Bayes rule.

Equation 1 may be transformed into Equation 2 using the log-odd notation proposed in Non-Patent Document [4] Hans P Moravec and Alberto Elfes, "High resolution maps from wide angle sonar", in Robotics and Automation. Proceedings. 1985 IEEE International Conference on. IEEE, 1985, vol. 2, pp. 116-121.

$$L(n|z_{1:t}) = L(n|z_{1:t-1}) + L(n|z_t) \quad \text{[Equation 2]}$$

In Equation 2, $L(n|z_t)$ is an inverse sensor model and may be defined Equation 3.

$$L(n \mid z_t) = \begin{cases} l_{occ}, & \text{if the end point of a ray is in cell } n, \\ l_{free}, & \text{if a ray passes through the cell } n \end{cases} \quad \text{[Equation 3]}$$

When a cell has an occupancy probability accumulated over lone time steps, new input data that conflicts with the current state of the cell cannot change its state immediately. This over-confidence problem may occur frequently in dynamic environments. In this case, the over-confidence problem may be solved using a clamping policy that limits the occupancy probability of the cell based on minimum and maximum state bounds. That is, the state of the cell limited by either one of the two bounds may be considered to be fully free or fully occupied with a high occupancy probability.

FIG. 1 is a diagram showing octree map representations of four different rays having different end points in accordance with an embodiment of the present invention.

From FIG. 1, it may be seen that four different rays traverse the same cells on the octomap, but the four rays have different end points. In this case, if point clouds corresponding to the rays are individually updated one by one, redundant computations are made on traversal through the same set of cells, which may result in lower performance. Accordingly, any one of a plurality of rays 110 that traverses the same cells may be generated as a super ray 101, and map update may be performed. By updating the map using the super ray, redundant computations for the same cells can be removed, resulting in improved performance of the map update.

Figure 2:
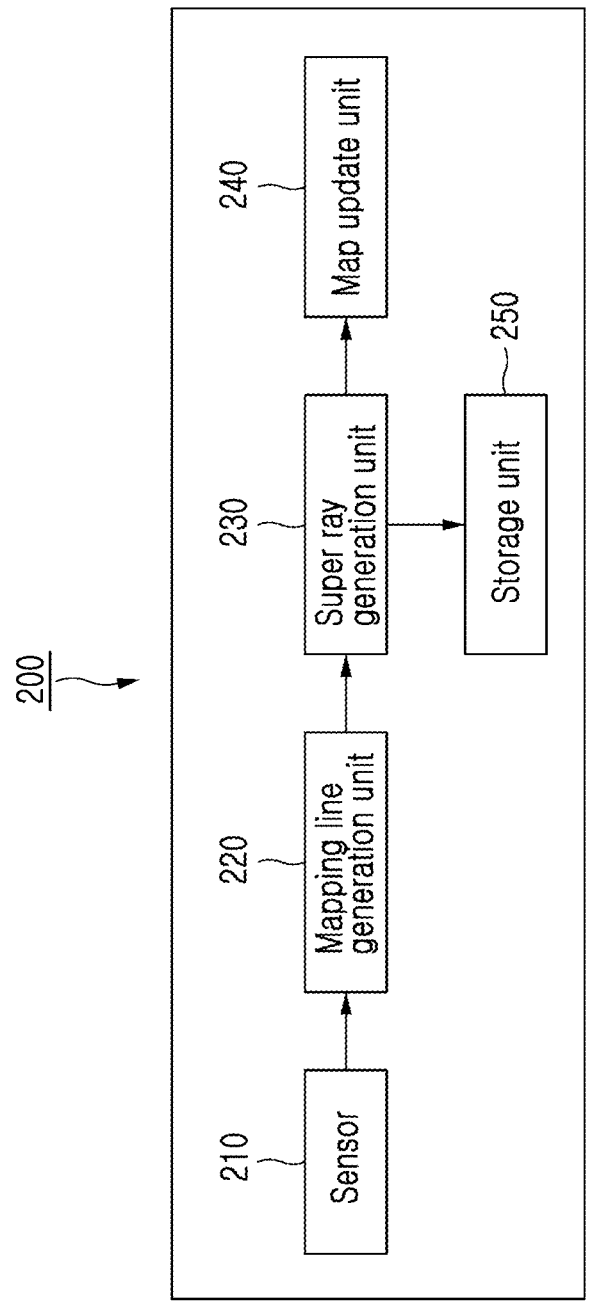
FIG. 2 is a block diagram showing the internal configuration of a system for updating an occupancy map according to an embodiment of the present invention.
Figure 3:
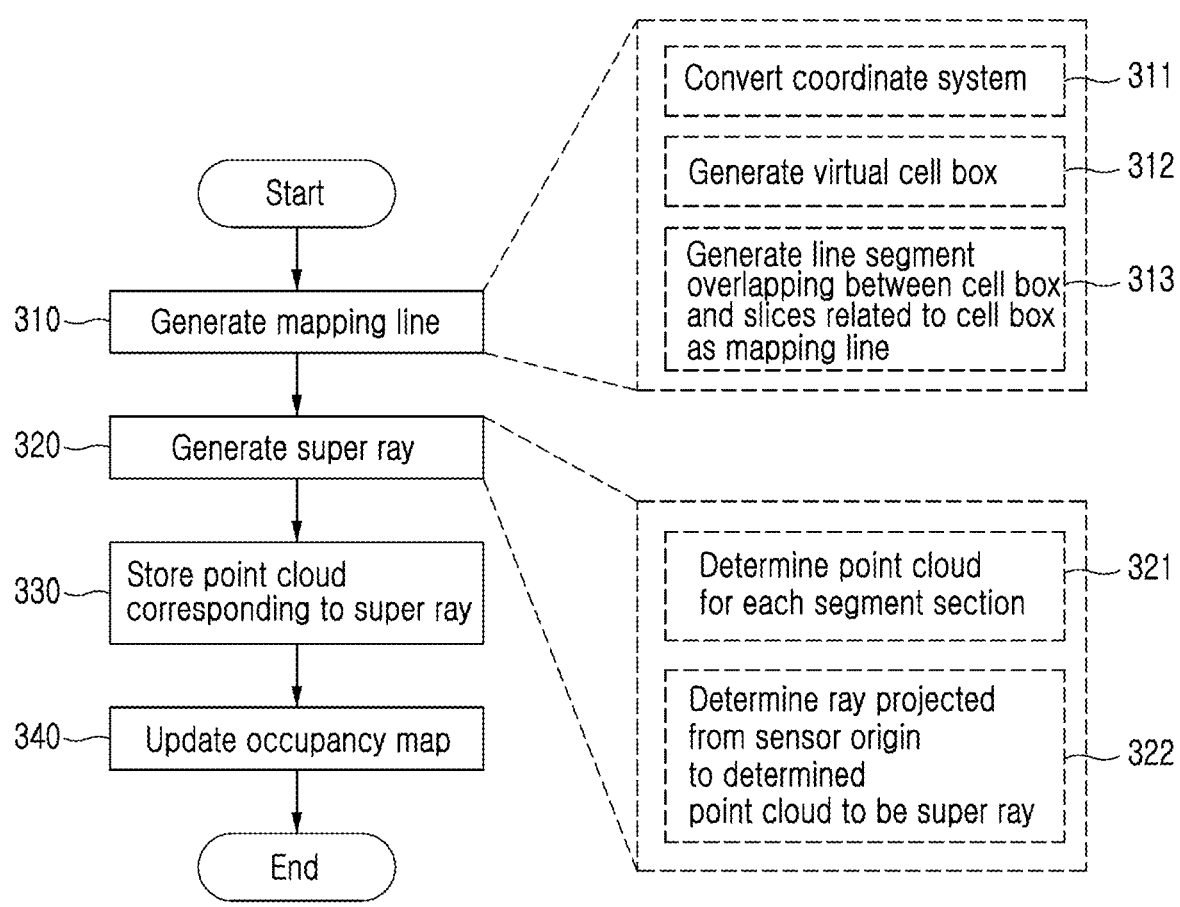
FIG. 3 is a flowchart showing a method of updating an occupancy map according to an embodiment of the present invention.

FIG. 2 is a block diagram showing the internal configuration of a system for updating an occupancy map according to an embodiment of the present invention. FIG. 3 is a flowchart showing a method of updating an occupancy map according to an embodiment of the present invention.

The system 200 for updating an occupancy map according to the present embodiment may include a sensor 210, a mapping line generation unit 220, a super ray generation unit 230, a map update unit 240 and a storage unit 250. The sensor 210, the mapping line generation unit 220, the super ray generation unit 230, the map update unit 240 and the storage unit 250 may be configured to perform step 310 to step 340 of FIG. 3. In the present embodiments, an example in which an occupancy map for point clouds is represented based on uniform grids is described, but this corresponds to an embodiment. Grids may have irregular sizes. That is, grid spaces (i.e., cells) forming an occupancy map may have different sizes. Furthermore, the mapping line generation unit 220, the super ray generation unit 230, the map update unit 240 and the storage unit 250 may be configured to be included in a processor configured to process an instruction of a computer program by performing basic calculation, logic and input/output computations. For example, the processor may be configured to execute a received instruction in response to program code stored in a recording device, such as memory.

The sensor 210 may sense objects that form a surrounding environment and that are to be sensed, and may provide sensed data, that is, point clouds, to the system 200 for updating an occupancy map. In this case, the sensor 210 may be included in the system 200 for updating an occupancy map or may be implemented separately from the system 200 for updating an occupancy map. For example, the sensor 210 may provide sensed point clouds to the system 200 for updating an occupancy map through a short-distance wireless or wired communication module.

For example, the sensor 210 may sense the surrounding environment of a robot or autonomous vehicle, and may provide sensed point clouds to the mapping line generation unit 220 for the generation of an occupancy map. In this case, the sensor 210 may provide point clouds sensed for a predetermined specific time, and may provide the mapping line generation unit 220 with point clouds sensed for a specific time every frame or every predetermined time.

At step 310, the mapping line generation unit 220 may generate a mapping line based on the point clouds obtained from the sensor 210. In this case, since the coordinate system of the point clouds obtained from the sensor 210 has been defined in a sensor coordinate system, it is necessary to convert the coordinate system into the world coordinate system for representations into an occupancy map.

At step 311, the mapping line generation unit 220 may convert the coordinate system of the point clouds, obtained from the sensor 210, into the world coordinate system. In this case, assuming that the location and direction of the sensor on the world coordinate system are already known, the coordinate system of the point clouds may be converted from the sensor coordinate system to the world coordinate system. Furthermore, the update of the occupancy map may be processed using the point clouds based on the converted world coordinate system.

At step 312, the mapping line generation unit 220 may generate a virtual cell box, including all of point clouds that belong to the point clouds whose coordinate system has been converted and that correspond to any one of a plurality of cells forming the occupancy map.

At step 313, a line segment that overlaps between the cell box generated based on the sensor origin in the occupancy map and slices related to the cell box may be generated as the mapping line. In this case, a detailed operation of generating the mapping line is described later with reference to FIG. 4.

At step 320, when the mapping line is generated, the super ray generation unit 230 may generate a super ray by identifying a cell that belongs to the plurality of cells forming the occupancy map and that traverses the same cells based on the generated mapping line.

At step 321, the super ray generation unit 230 may determine any one point cloud for each segment section with respect to point clouds located in each of a plurality of segment sections that divides the mapping line.

At step 322, the super ray generation unit 230 may determine a ray projected (or screened) from the sensor origin to the determined point cloud to be a super ray. In this case, the super ray generation unit 230 may calculate the number of point clouds located in the plurality of segment sections for each segment section, and may set the number of calculated point clouds as weight of the super ray. In this case, a detailed operation of generating the super ray is described later with reference to FIG. 5.

At step 330, the storage unit 250 may store the point cloud corresponding to the super ray instead of a plurality of point clouds corresponding to the same segment section for the update of the occupancy map.

At step 340, the map update unit 240 may update the occupancy map by updating a cell through which the super ray corresponding to some of the plurality of cells forming the occupancy map passes. That is, a cell through which a super ray belonging to a plurality of rays and traversing the same cells passes is updated without performing redundant updates on the same cells by updating a cell through which all of rays pass. Accordingly, redundant computation can be eliminated and the update speed can be enhanced.

Figure 4:
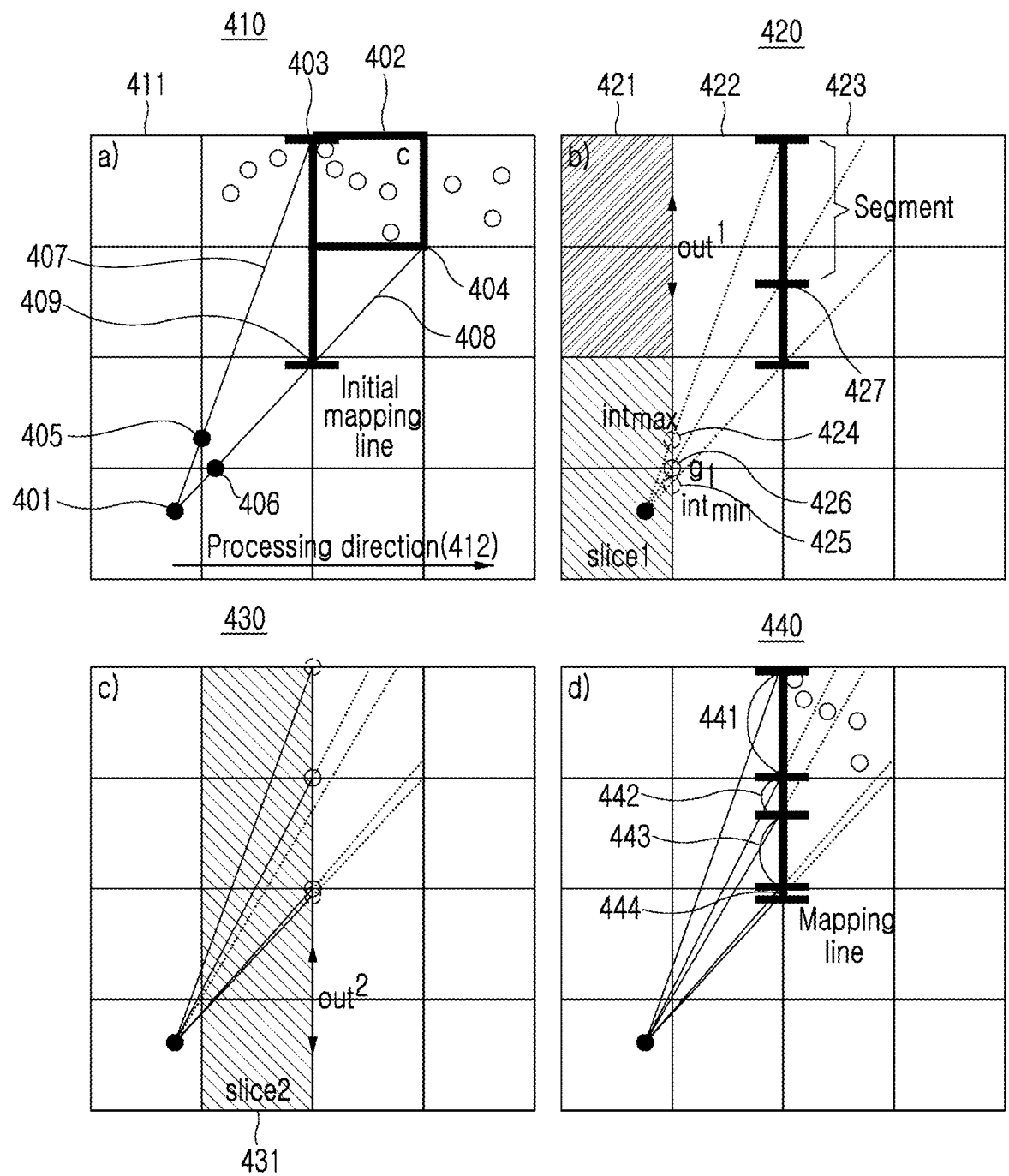
FIG. 4 is a diagram provided to describe the generation of a mapping line according to an embodiment of the present invention.

FIG. 4 is a diagram provided to describe the generation of a mapping line according to an embodiment of the present invention.

Referring to FIG. 4, an occupancy map 410 may be divided into a plurality of cells (i.e., a plurality of grid spaces). In FIG. 4, it is assumed that the grid spaces forming the occupancy map 410 have a uniform size.

The mapping line generation unit 220 may generate a virtual cell box 402, including all of point clouds belonging to any one cell (e.g., a cell C) of the plurality of cells forming the occupancy map 410 from the sensor origin 401, with respect to the cell C. Furthermore, the mapping line generation unit 220 may configure a seed frustum from the sensor origin 401 to the cell box 402.

In this case, in order to generate a mapping line, the seed frustum may be divided into a plurality of sub-frustums in a processing direction 412, and the plurality of sub-frustums may be processed for each slice. In order to process the plurality of sub-frustums for each slice, any one of an x axis, a y axis and a z axis may be selected, and the selected axis direction may become a processing direction. FIG. 4 illustrates an example in which a mapping line is generated using the x-axis direction as the processing direction, but this is an embodiment. For example, the y-axis or z-axis direction may become the processing direction. In FIG. 4, a slice may include a plurality of cells. For example, a slice 1 421 may include four cells, and a slice 2 422 may include four cells that neighbor the four cells included in the slice 1 in the processing direction. FIG. 4 shows an example in which the occupancy map includes four slices.

In this case, in order to identify point clouds mapped to the same super ray, a line segment that overlaps between the cell C and a slice (i.e., a slice 3 423) including the cell C may be generated as a mapping line.

For example, the mapping line generation unit 220 may determine a plurality of intersection points 405 and 406 connected from the sensor origin 401 in a slice 1 411, including the sensor origin 401, to both end points 403 and 404 of the cell box 402. Referring to an occupancy map 420, the mapping line generation unit 220 may determine a grid point (g1) 426 located between the determined intersection points 424 and 425 in the slice 1 411 including the sensor origin 401. Furthermore, the mapping line generation unit 220 may divide an initial mapping line into a plurality of segment sections by dividing the seed frustum into a plurality of sub-frustums based on the determined grid point 426. For example, if the sensor origin 401 and both end points 403 and 404 of the cell box 402 in the occupancy map 410 are to be connected, the intersection points 403 and 404 with the two line segments 407 and 408 and the cell box 402 in a slice 3 including the cell C may be generated as an initial mapping line. Furthermore, the initial mapping line may be divided into a plurality of segment sections by dividing the seed frustum. The initial mapping line starts from a single line segment representing a super ray, and the seed frustum is divided into a plurality of sub-frustums and thus the initial mapping line is divided into several segment sections. Accordingly, a line segment corresponding to each of the segment sections may correspond to each of a plurality of super rays.

For example, in the occupancy map 420, a line segment that passes through the grid point (g1) 426 from the sensor origin and that connects to any one point 427 meeting the initial mapping line may divide the initial mapping line into a plurality of segment sections. That is, the line segment that is based on the grid point 426 and that connects to the point 427 may divide the seed frustum into two sub-frustums. A cell through which a ray corresponding to the line segment passes may be different due to the grid point 426. Referring to an occupancy map 430, the mapping line generation unit 220 may divide an initial mapping line, divided into two segment sections, into four segment sections by repeatedly performing an operation of dividing the initial mapping line into a plurality of segment sections on the slice 2 431. For example, referring to an occupancy map 440, the initial mapping line may be divided into four segment sections 441, 442, 443 and 444. In this case, in order to divide the initial mapping line into a plurality of segment sections (e.g., the segment section 1 to the segment section 4), it may be important to efficiently determine a grid point within a frustum.

For example, referring to the occupancy map 420, out[1] may indicate a distant line in a corresponding slice (i.e., the slice 1) in the processing direction. The mapping line generation unit 220 may determine a grid point based on intersection points $int_{max}$ and $int_{min}$ between the corresponding slice (i.e., the slice 1) and the seed frustum. That is, the grid point 426 present between the intersection points 424 and 425 between the slice 1 and the seed frustum may be determined to be a grid point within the frustum. In this case, if the first slice including the sensor origin is defined as the slice 1 and a slice including the cell C is defined as N, that is, the last slice, the mapping line generation unit 220 may divide the initial mapping line into a plurality of segments by repeatedly performing an operation of determining intersection points in each slice from the slice 1 to a slice N−1 and determining a grid point located between the intersection point up to the slice N−1. For example, assuming that m grid points are present, it may be defined as $g=\{g_1, g_2, \ldots g_m\}$. As described above, a grid point may indicate a point at which the seed frustum or the current frustum is partitioned into (m+1) sub-frustums. As a result, (m+1) segments may be generated (or divided) in the initial mapping line. As described above, a grid point can be easily determined due to the discrete nature of occupancy maps, and an initial mapping line can be rapidly divided into a plurality of segments based on the grid point without using an expensive sorting method. A pseudo code algorithm for generating the mapping line in relation to the cell C may be the same as Table 1.

TABLE 1

Algorithm 1: BUILD MAPPING LINE

Input: $C_{box}$, a cell box in 2-D, O, a sensor origin in 2-D
Output: $M_{line}$, a mapping line
1    $M_{line} \leftarrow$ InitMappingLine($C_{box}$)
2    $S_{slice} \leftarrow$ InitSlices(O, $C_{box}$)
3    for i in 1 : length($S_{slice}$) − 1 do
4        g ← ComputeGridPoints($S_{slice}$[i], $C_{box}$)
5        for j in 1 : length(g) do
6            // project onto mapping line without sorting $M_{line}$.insert(Projection($g_j$))
7    return $M_{line}$ FIG. 5 is a diagram provided to describe an operation of generating a super ray according to an embodiment of the present invention.

Figure 5:
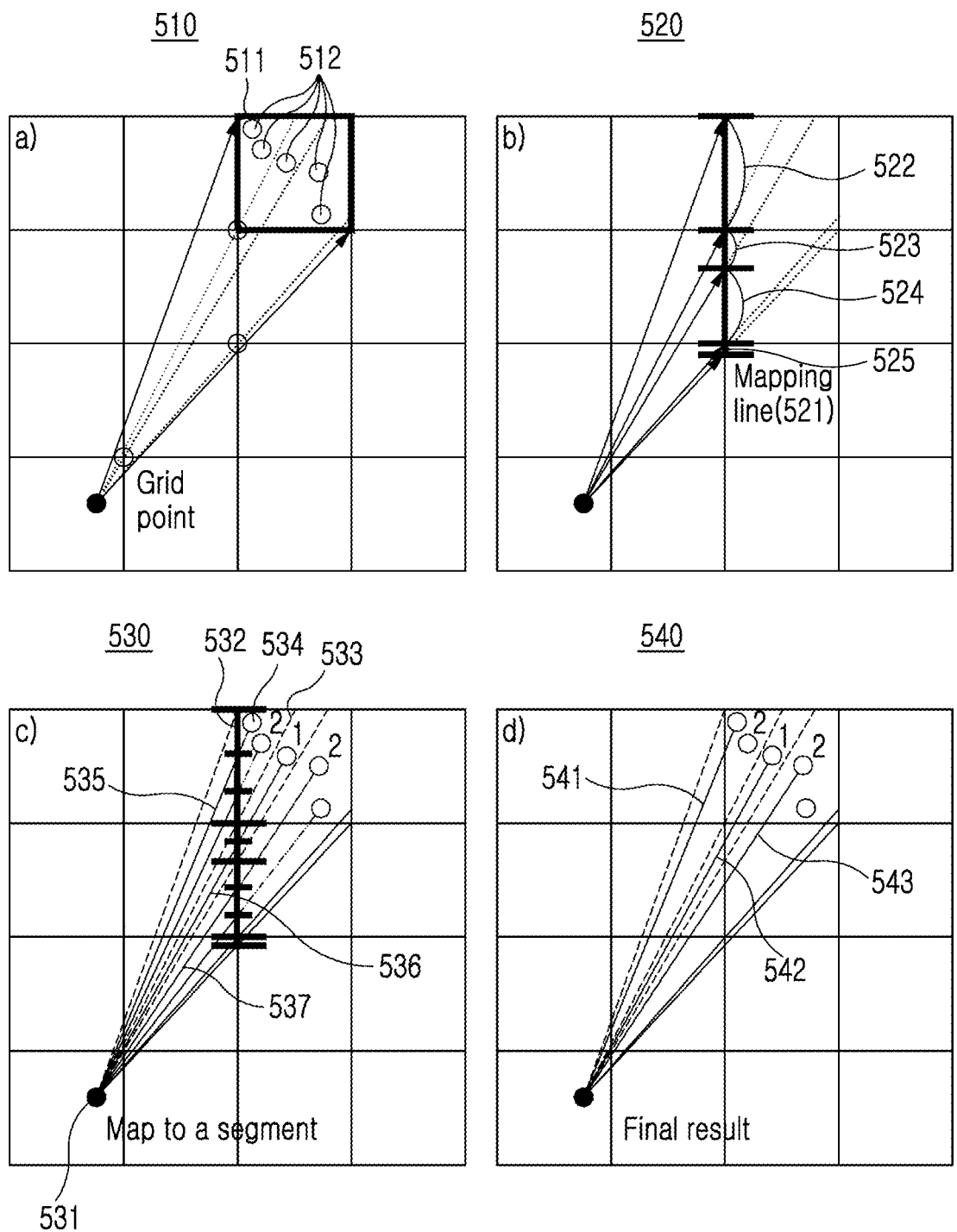
FIG. 5 is a diagram provided to describe an operation of generating a super ray according to an embodiment of the present invention.

Referring to FIG. 5, all of point clouds 512 corresponding to a cell C 511 obtained from the sensor may be mapped to an occupancy map 510. For example, five point clouds 512 belonging to the cell C 511 may be represented in the occupancy map 510. In this case, the super ray generation unit 230 may determine a ray corresponding to any one of point clouds, corresponding to a plurality of segment sections divided with respect to a mapping line, to be a super ray. For example, referring to the occupancy map 520, a mapping line 521 may be divided into four segment sections 522, 523, 524 and 525 based on the grid point of a slice 1 and the grid point of a slice 2. Accordingly, in an occupancy map 530, the super ray generation unit 230 may determine a ray, corresponding to any one of point clouds located between rays 532 and 533 traversing from a sensor origin 531 to both end points of the segment section 1 522, to be a super ray. For example, a ray corresponding to a first point cloud 534 (i.e., a ray traversing from the sensor origin to the first point cloud) may be determined to be a super ray 535. Likewise, the super ray generation unit 230 may determine the super ray 536 of the segment section 2 and the super ray 537 of the segment section 3. In this case, a super ray may not be present in the segment section 4 because a mapped point cloud is not present.

Furthermore, the super ray generation unit 230 may compute the number of point clouds mapped (i.e., assigned) to each segment section. For example, the number of mapped point clouds of the segment section 1 may be calculated as 2, the number of mapped point clouds of the segment section 2 may be calculated as 1, and the number of mapped point clouds of the segment section 3 may be calculated as 2. The super ray generation unit 230 may set the number of calculated point clouds as weight of the super ray of a corresponding segment section. That is, the weight of a super ray 1 541 may be set to 2, the weight of the super ray 2 542 may be set to 1, and the weight of a super ray 3 543 may be set to 2. Accordingly, the map update unit 240 may perform update on an occupancy map by applying weight set to each super ray, that is, weight corresponding to the number of point clouds bounded to an occupancy probability when updating the occupancy map. Furthermore, a cell through which the super ray 1 541 passes and a cell through which at least one ray belonging to a corresponding segment passes may be the same. That is, the super ray of each segment section and rays corresponding to respective point clouds belonging to the same segment may traverse the same cells in the occupancy map. Accordingly, a cell through which not all of rays in an occupancy map, but a super ray passes is updated. As a result, the map update speed can be enhanced because redundant cells through which the remaining rays pass do not need to be redundantly updated.

Figure 6:
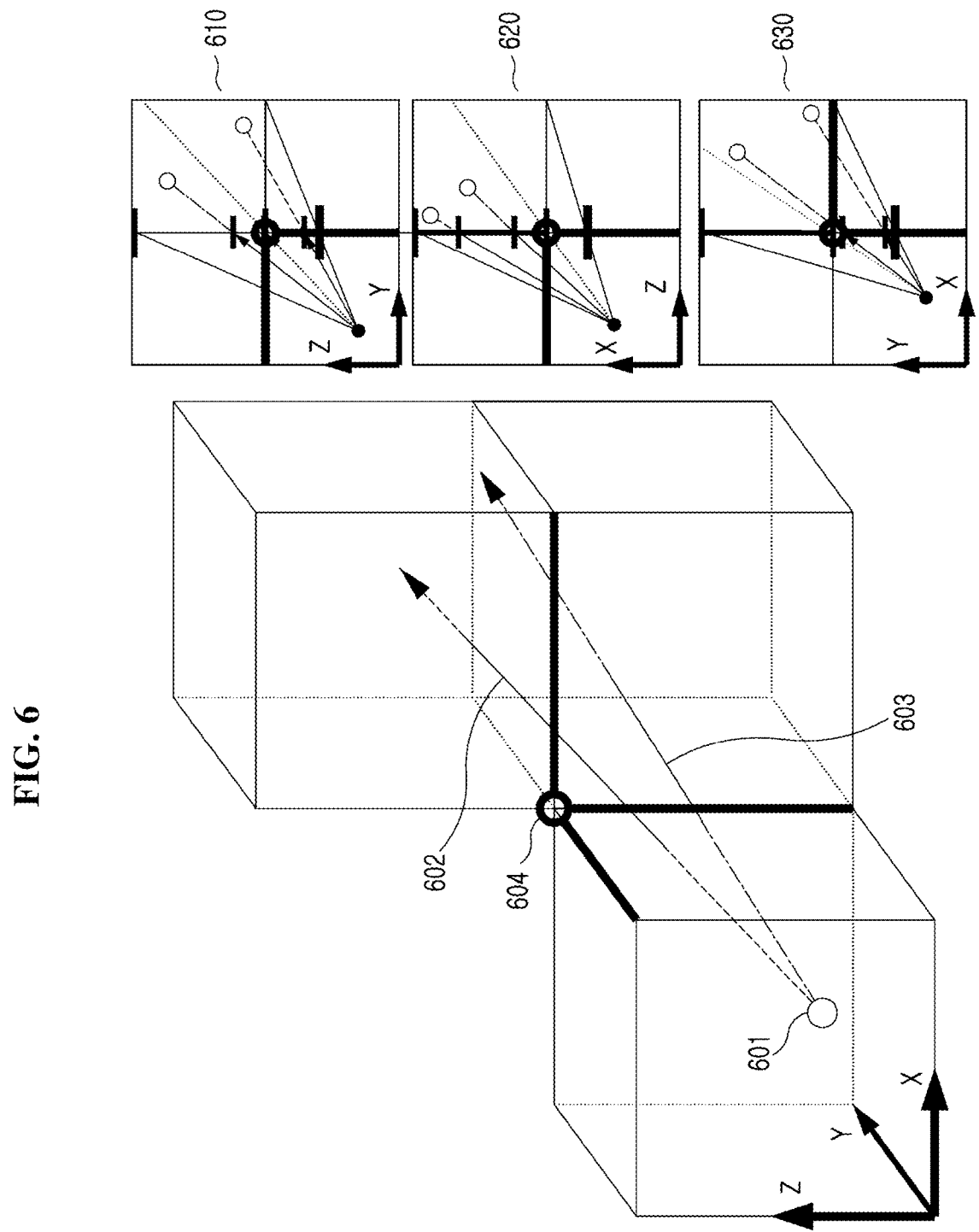
FIG. 6 is a diagram provided to describe an operation of extending an operation of generating a super ray to the 3-D in accordance with an embodiment of the present invention.

FIG. 6 is a diagram provided to describe an operation of extending an operation of generating a super ray to the 3-D in accordance with an embodiment of the present invention.

In order to extend a super ray to the 3-D, the mapping line of a 2-D plane may be generated in three different 2-D planes, and the super ray may be extended to the 3-D. For example, the mapping line generation unit 220 may generate the mapping line of a 2-D plane with respect to each of an X-Y plane, a Y-Z plane and a Z-X plane. A super ray based on the 2-D coordinate system may be extended to the 3-D coordinate system through the generation of the mapping line.

First, for 3-D representations, a bound volume including point clouds may be computed. As in the 2-D, a seed frustum that traverse the volume may be configured. Thereafter, the frustum may be partitioned into sub-frustums, and a super ray that accesses the same cell set as each of the partitioned sub-frustums may be determined.

From FIG. 6, it may be seen that two rays 602 and 603 are divided from a sensor origin 601 based on the grid point 604 of each plane and the two rays access different cells. That is, the access pattern of the two rays may be different from a grid point projected onto a Y-Z plane 610. As described above, mapping lines for a Y-Z plane 610, a Z-X plane 620 and an X-Y plane 630 may be generated by projecting a grid point onto each of the three different planes and checking whether a corresponding grid point has been divided into grid points in the 2-D plane. Accordingly, the generation of the mapping lines may be extended to the 3-D. When a mapping line is generated in the 3-D as described above, all of point clouds that have been obtained from the sensor and that belong to a specific cell are mapped to (or projected onto) the mapping line of each plane. When a point corresponding to the same segment in all of the three mapping lines is determined, the corresponding point may be generated as a super ray having the same access pattern. The pseudo code algorithm for generating a super ray for a cell in the 3-D may be the same as Table 2.

TABLE 2

Algorithm 2: GENERATE SUPER RAYS

Input: P, a set of points in a cell, O, a sensor origin
Output: $S_{ray}$, a set of super rays
1    $C_{box} \leftarrow$ ComputeCellBox(P)
2    $M_{xy} \leftarrow$ BuildMappingLine($C_{box}$(X, Y), O(X, Y))
3    $M_{yz} \leftarrow$ BuildMappingLine($C_{box}$(Y, Z), O(Y, Z))
4    $M_{zx} \leftarrow$ BuildMappingLine($C_{box}$(Z, X), O(Z, X))
5    $S_{ray} \leftarrow$ GenerateSuperRays($M_{xy}$, $M_{yz}$, $M_{zx}$, P)
6    return $S_{ray}$ Table 3 may indicate super rays and weight for each super ray.

TABLE 3

| Evaluation | # of Points | | | |
|---|---|---|---|---|
| | Indoor [89,446] | | Outdoor [247,817] | |
| | # of Super Rays | # of Points/ Super Ray | # of Super Rays | # of Points/ Super Ray |
| 0.2 m | 25064 | 3.6 | 150453 | 1.6 |
| 0.4 m | 10668 | 8.3 | 102076 | 2.4 |
| 0.6 m | 5106 | 17.5 | 72191 | 3.4 |
| 0.8 m | 3072 | 29.1 | 52906 | 4.7 |
| 1.0 m | 2073 | 43.1 | 40833 | 6.1 |

From Table 3, it may be seen that in the case of resolution 0.6 m, an average of 17.5 point clouds of indoor point clouds has been grouped and an average of 3.4 point clouds of outdoor point clouds has been grouped. That is, it may be seen that rays corresponding to an average of 17.5 point clouds traverse the same cell in the indoor datasets and rays corresponding to an average of 3.4 point clouds traverse the same cell in the outdoor datasets. As the grouping ratio rises, the number of traversing cells during map update in indoor and outdoor datasets can be relatively greatly reduced compared to a case where the grouping ratio is small.

A super ray is generated with respect to several point clouds within a single cell. Accordingly, an occupancy map may be updated using an inverse sensor model modified by considering the weight w of the super ray. The inverse sensor model of Equation 3 may be modified into Equation 4.

$$L(n\mid z_t) = \begin{cases} wl_{occ}, & \text{if the end point of a super ray is in } n, \\ wl_{free}, & \text{if a super ray passes through the cell} \end{cases} \quad \text{[Equation 4]}$$

If an occupancy map is updated using a super ray, when the number of point clouds within a cell is small, the super ray may have a single point. If a super ray has a single point as described above, overhead may be increased. Accordingly, the super ray generation unit 230 may generate a super ray using a predetermined threshold value k. In this case, the threshold value k may indicate a minimum number of point clouds included in a specific cell.

For example, if the number of point clouds included in a cell is smaller than the threshold value k, the super ray generation unit 230 may generate a super ray for each of all of points included in the cell. That is, all of the point clouds within the cell may be individually processed. Furthermore, if the number of point clouds included in a cell is the threshold value k or more, the super ray generation unit 230 may determine any one of a plurality of rays belonging to a segment section to be a super ray. The map update unit 240 may update an occupancy map based on the super ray. In updating an occupancy map as described above, the threshold value k may be used to check whether generating a super ray for a specific cell is advantageous for the occupancy map. If the number of point clouds within the specific cell is the threshold value k or more, the super ray generation unit 230 may determine to generate a super ray. If the number of point clouds within the specific cell is smaller than the threshold value k, the super ray generation unit 230 does not generate a super ray, and the map update unit 240 may determine to update the occupancy map with respect to each of all of the point clouds within the specific cell. Furthermore, the occupancy map may be updated according to the determined method.

A comparison between performance if an occupancy map is updated using a super ray and performance of the existing update method using the 3-D digital differential analyzer (3-DDDA) algorithm is described below. In this case, the performance comparison may include both the time taken to generate a super ray and the update time of a map including a super ray. That is, whether performance has been improved or not if a super ray is used is determined by considering the time taken to generate a super ray in addition to whether map update will be performed or not. A map update method based on the 3-D digital differential analyzer (3-DDDA) algorithm was proposed in Non-Patent Document [5] Kai M Wurm, Armin Hornung, Maren Bennewitz, Cyrill Stachniss, and Wolfram Burgard, "*Octomap: A probabilistic, flexible, and compact 3d map representation for robotic systems*", in Proc. of the ICRA 2010 workshop on best practice in 3-D perception and modeling for mobile manipulation, 2010, vol. 2.

Figure 7:
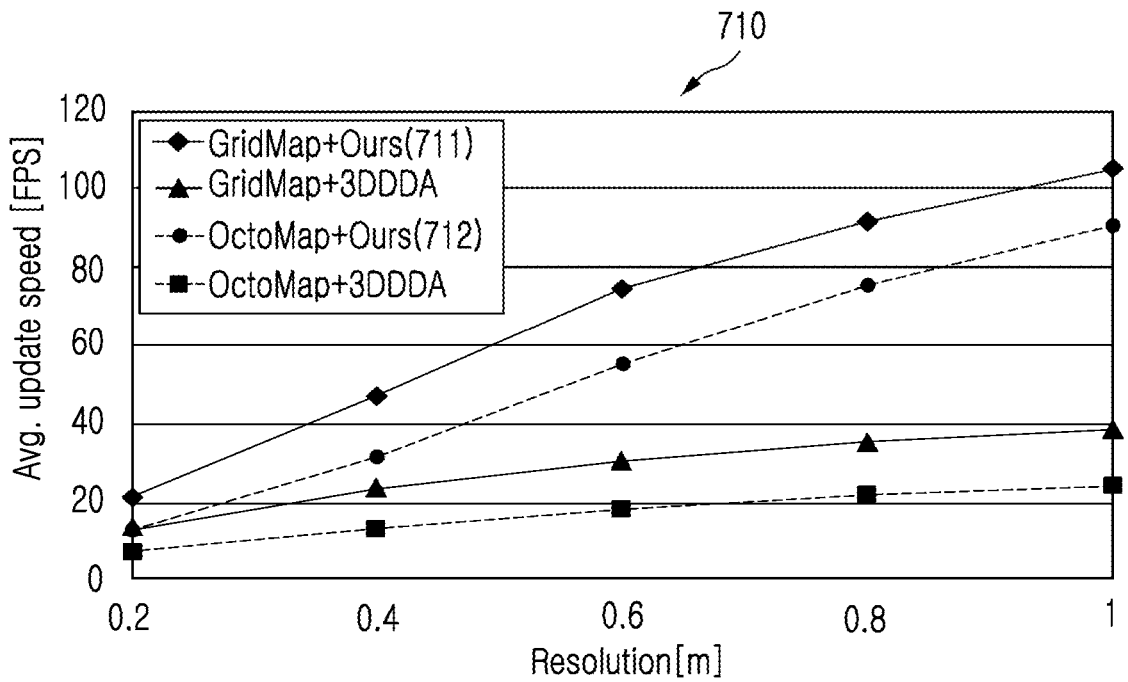
FIG. 7 is a graph showing an average FPS tested in an octomap and a grid map in accordance with an embodiment of the present invention.
Figure 7:
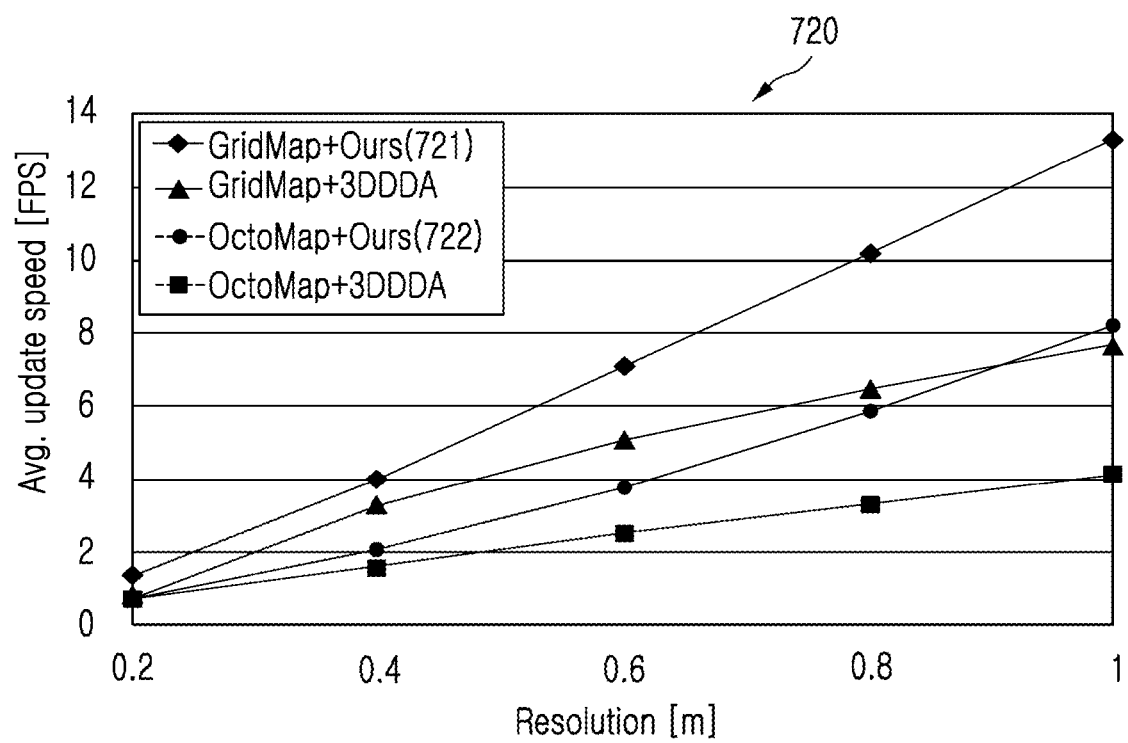

FIG. 7 is a graph showing an average FPS tested in an octomap and a grid map in accordance with an embodiment of the present invention.

In FIG. 7, a graph 710 may show the results of simulations performed on point clouds in an indoor environment. A graph 720 may show the results of simulations performed on point clouds in an outdoor environment. Table 4 is the results of the simulations of FIG. 7, and may show a super ray generation time and map update time.

TABLE 4

| Evaluation | Resolution | | | | | | | | | | | | | | |
|---|---|---|---|---|---|---|---|---|---|---|---|---|---|---|---|
| | 0.2 m | | | 0.4 m | | | 0.6 m | | | 0.8 m | | | 1.0 m | | |
| | FPS | Proc. [ms] | Update [ms] | FPS | Proc. [ms] | Update [ms] | FPS | Proc. [ms] | Update [ms] | FPS | Proc. [ms] | Update [ms] | FPS | Proc. [ms] | Update [ms] |
| Indoor Dataset | | | | | | | | | | | | | | | |
| OctoMap + 3DDDA | 7.3 | 0 | 137.6 (2195K) | 13.2 | 0 | 76.3 (1132K) | 18.1 | 0 | 55.6 (788K) | 21.7 | 0 | 46.2 (619K) | 24.4 | 0 | 41.1 (538K) |
| OctoMap + Ours | 12.1 | 16.6 | 67.7 (1260K) | 31.1 | 12.6 | 20.2 (373K) | 55.2 | 10.2 | 8.2 (160K) | 75.2 | 9.2 | 4.3 (88K) | 90.5 | 8.6 | 2.5 (52K) |
| GridMap + 3DDDA | 13.6 | 0 | 74.0 (1531K) | 23.4 | 0 | 43.0 (826K) | 30.6 | 0 | 32.9 (576K) | 35.4 | 0 | 28.3 (448K) | 38.8 | 0 | 25.8 (392K) |
| GridMap + Ours | 21.0 | 16.3 | 32.1 (739K) | 46.9 | 12.3 | 9.3 (205K) | 74.7 | 9.9 | 3.6 (80K) | 91.8 | 9.1 | 1.9 (40K) | 105.2 | 8.4 | 1.2 (23K) |

TABLE 4-continued

| | Resolution | | | | | | | | | | | | | | |
|---|---|---|---|---|---|---|---|---|---|---|---|---|---|---|---|
| | 0.2 m | | | 0.4 m | | | 0.6 m | | | 0.8 m | | | 1.0 m | | |
| Evaluation | FPS | Proc. [ms] | Update [ms] | FPS | Proc. [ms] | Update [ms] | FPS | Proc. [ms] | Update [ms] | FPS | Proc. [ms] | Update [ms] | FPS | Proc. [ms] | Update [ms] |
| Outdoor Dataset | | | | | | | | | | | | | | | |
| OctoMap + 3DDDA | 0.7 | 0 | 1516.1 (28.4M) | 1.6 | 0 | 639.5 (10.5M) | 2.5 | 0 | 412.9 (6.5M) | 3.3 | 0 | 314.7 (4.8M) | 4.1 | 0 | 252.7 (3.8M) |
| OctoMap + Ours | 0.7 | 68.3 | 1395.8 (26.5M) | 2.1 | 57.0 | 449.1 (8.3M) | 3.8 | 51.1 | 231.8 (4.2M) | 5.9 | 44.5 | 137.5 (2.5M) | 8.2 | 41.3 | 89.0 (1.6M) |
| GridMap + 3DDDA | 1.4 | 0 | 783.1 (12.7M) | 3.3 | 0 | 321.6 (6.5M) | 5.1 | 0 | 207.7 (4.4M) | 6.5 | 0 | 162.1 (3.4M) | 7.7 | 0 | 136.1 (2.8M) |
| GridMap + Ours | 1.4 | 65.9 | 708.3 (11.0M) | 4.0 | 57.7 | 211.9 (4.6M) | 7.1 | 50.2 | 100.8 (2.5M) | 10.2 | 43.9 | 61.3 (1.5M) | 13.3 | 40.2 | 39.8 (1.0M) |

From FIG. 7, it may be seen that in all of the indoor and outdoor environments and the grid map and the octomap, performance was more improved when a super ray was generated and an occupancy map was updated using the super ray (711, 712, 721 and 722) than when the 3-D digital differential analyzer (3-DDDA) algorithm was used. That is, it may be seen that an average number of frames per second (FPS) was improved. Furthermore, from Table 4, it may be seen that improved performance of an average of 2.5 times for indoor point clouds and improved performance of an average 1.6 times for outdoor point clouds were achieved compared to the 3-D digital differential analyzer algorithm. It may also be seen that the FPS was more increased when resolution was high (0.8 m) than when resolution was low (0.2 m). That is, it may be seen that the update of an occupancy map can be processed rapidly (i.e., the update time is reduced) while high resolution is maintained. Accordingly, an autonomous vehicle or a robot can rapidly detect a collision, and can rapidly handle an object (e.g., an obstacle) that varies in a surrounding situation.

Figure 8:
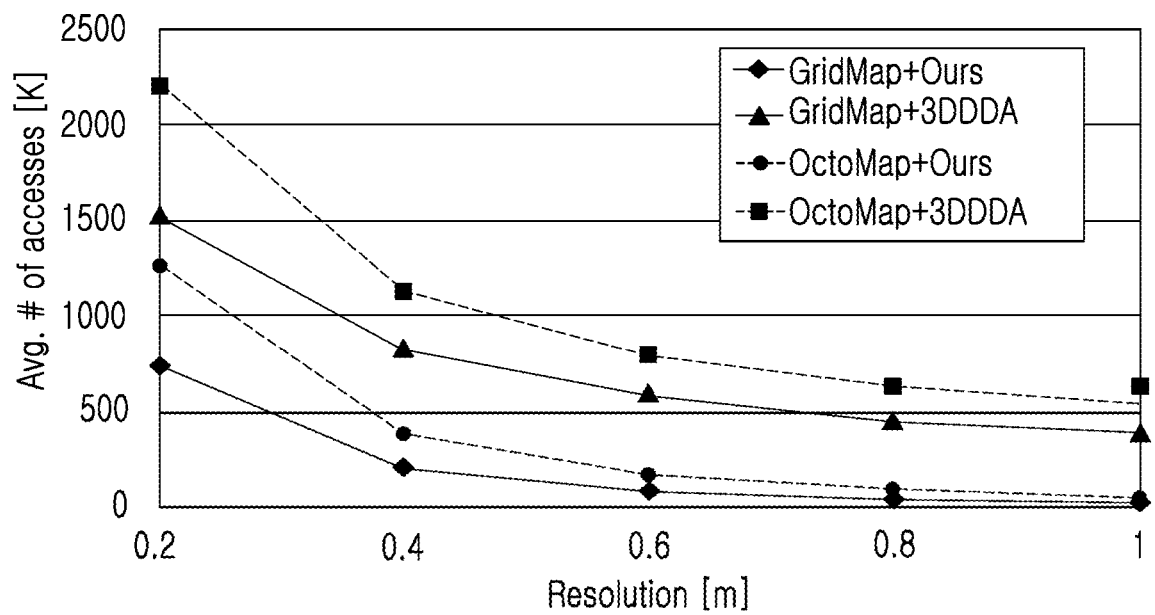
FIG. 8 is a graph showing the number of accessed cells tested in the octomap and the grid map in accordance with an embodiment of the present invention.
Figure 8:
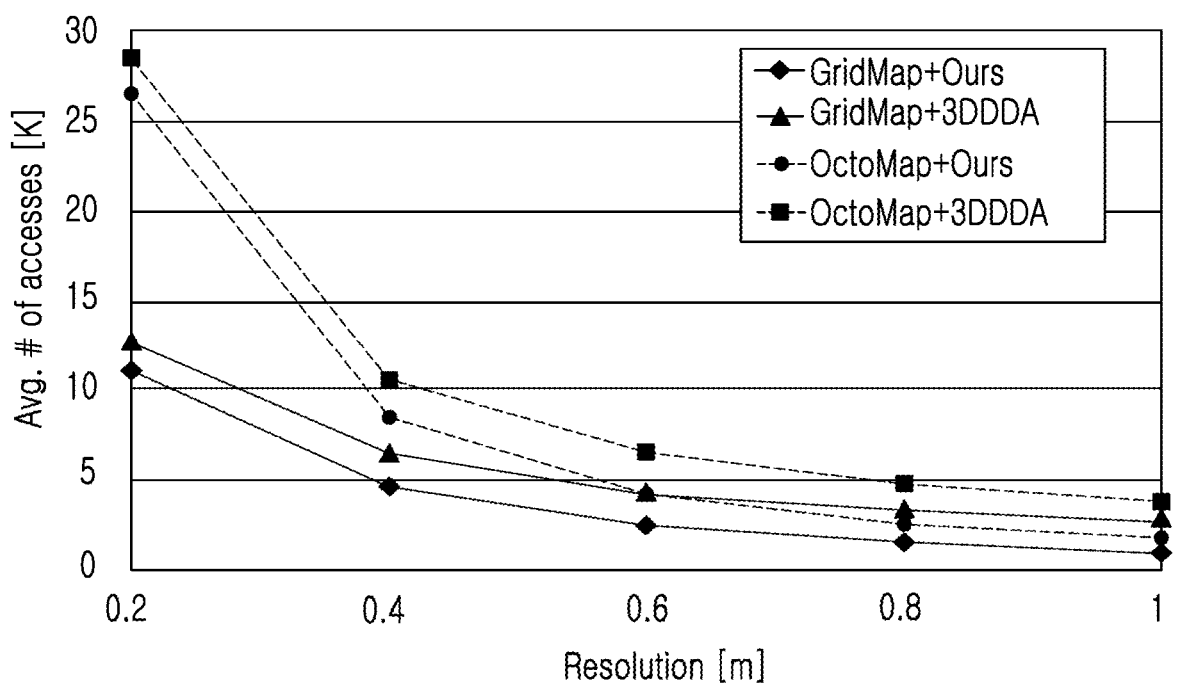

FIG. 8 is a graph showing the number of accessed cells tested in the octomap and the grid map in accordance with an embodiment of the present invention.

That is, FIG. 8 may show the graph illustrating a total time taken to generate a super ray and to update an occupancy map (e.g., an octomap and a grid map) based on the generated super ray.

From FIG. 8, it may be seen that if the occupancy map was updated using a super ray in both indoor and outdoor environments, the total time was reduced by an average of 5.6 times to a maximum of 20 times compared to a case where the 3-D digital differential analyzer (3-DDDA) algorithm was used. It may be seen that the time taken to generate a super ray was different depending on resolution and sets of point clouds, overall performance was improved compared to the existing Bresenham method. For example, in the case of indoor datasets including point clouds of 89K, about 16.6 ms may be taken to generate 25.1K super rays in resolution of 0.2 m if a super ray is used. As a result, it may be seen that 1.51K super rays per second are generated. Since each super ray has an average of 2.6 point clouds, time of 8.6 ms may be consumed to generate 2.1K super rays in resolution of 1 m. That is, this may mean that 0.24K super rays are generated per second and each of the super rays has 43.1 point clouds. Accordingly, system performance can be improved because the number of cells traversed for the update of an occupancy map is reduced at a high ratio.

As an occupancy map is updated based on a super ray as described above, the number of cells traversed in a map update process is significantly reduced, thereby being capable of reducing the update time, that is, improving the update speed.

Figure 9:
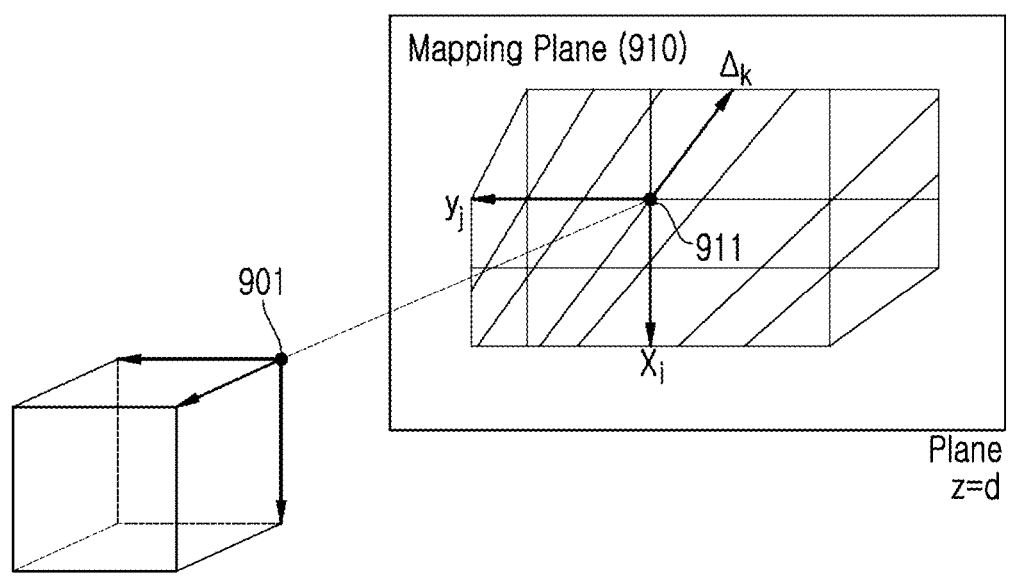
FIG. 9 is a diagram showing mapping planes used when an operation of generating a super ray is extended to the 3-D in accordance with an embodiment of the present invention.

FIG. 9 is a diagram showing mapping planes used when an operation of generating a super ray is extended to the 3-D in accordance with an embodiment of the present invention.

In FIG. 9, z=d may indicate a specific plane (an X-Y plane having a z=d value) in the 3-D, and $\Delta_k$ may indicate the slope value of an edge 911 mapped/projected onto the plane z=d. That is, as in the case where all of grid points from a sensor origin in the 2-D are mapped/projected onto a mapping line, the edges of all of cells from a sensor origin in the 3-D may be mapped/projected onto the mapping plane 910.

The mapping line was used to generate a super ray in the 2-D. In FIG. 6, the concept of generating the super ray in the 2-D has been expanded to the 3-D. In this case, the mapping plane may used when the concept is extended to the 3-D. The concepts of generating the super rays in the 2-D and 3-D may be the same as Table 5.

TABLE 5

| | 2-D | 3-D |
|---|---|---|
| Data structure for generating super ray | Mapping line | Mapping plane |
| Element of mapping data structure | Segment | Region |
| Geometric element to identify traversal pattern of ray | Grid point of cell | Edge of cell |

If the traversal pattern of a ray has been divided by a grid point in the 2-D, an edge may divide the traversal pattern of a ray in the 3-D. Accordingly, a data structure for generating a super ray may be extended to the 3-D using a mapping plane in order to classify the traversal pattern of rays within a seed frustum and to select a super ray.

For example, in the 2-D, a single line segment has been divided into segments using all of grid points within a seed frustum, but in the 3-D, all of edges 901 and 911 within the seed frustum may be divided into regions by projecting them onto the mapping plane 910. In this case, each of the regions divided in the mapping plane 910 may indicate a 2-D region to which 3-D rays always traversing the same space may be mapped.

Accordingly, the mapping plane 910 may include several regions. In the mapping plane 910, one region has been mapped to one traversal pattern. Accordingly, the super ray generation unit 230 may generate a super ray by grouping rays mapped to the same region. In this case, an operation of dividing the mapping plane 910 into a plurality of regions by projecting the edges 911 onto the mapping plane may be performed by the mapping line generation unit 220 of FIG. 2 or may be performed by a mapping plane processor (not shown) for separately processing a process of extending the generation of a super ray to the 3-D using a mapping plane. If the operation is performed by the mapping plane processor, the system 200 for updating an occupancy map of FIG. 2 may further include the mapping plane processor (not shown).

Figure 10:
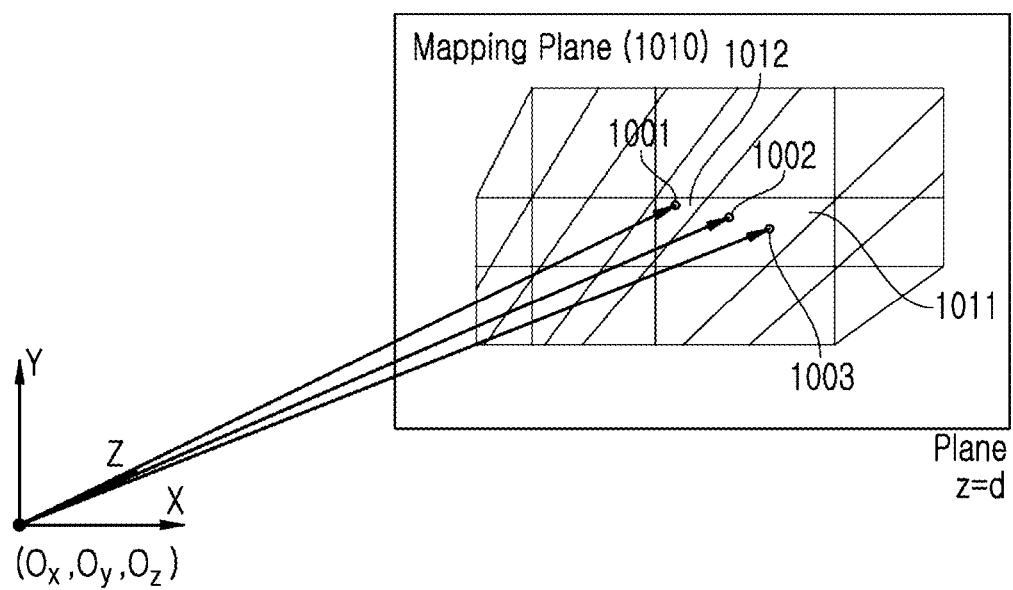
FIG. 10 is a diagram provided to describe an operation of generating a super ray by grouping rays belonging to the same region of regions included in a mapping plane in accordance with an embodiment of the present invention.

FIG. 10 is a diagram provided to describe an operation of generating a super ray by grouping rays belonging to the same region of regions included in a mapping plane in accordance with an embodiment of the present invention.

Referring to FIG. 10, rays 1002 and 1003 may be mapped to the same region 1011 of a plurality of regions included in the mapping plane 1010, and a ray 1001 may be mapped to a region 1012 different from the region 1011. Accordingly, the rays 1002 and 1003 mapped to the same region 1011 may be grouped as a single super ray because they traverse the same space. Accordingly, the super ray generation unit 230 may group the rays 1002 and 1003 belonging to the region 1011 as one same super ray, and may group the ray 1001 mapped to the different region 1012 as a super ray different from the super ray corresponding to the rays 1002 and 1003. For example, the super ray generation unit 230 may determine the ray 1001 to be a super ray that represents rays mapped to the corresponding region 1012, and may determine the ray 1003 to be a super ray that represents rays mapped to the corresponding region 1011.

Figure 11:
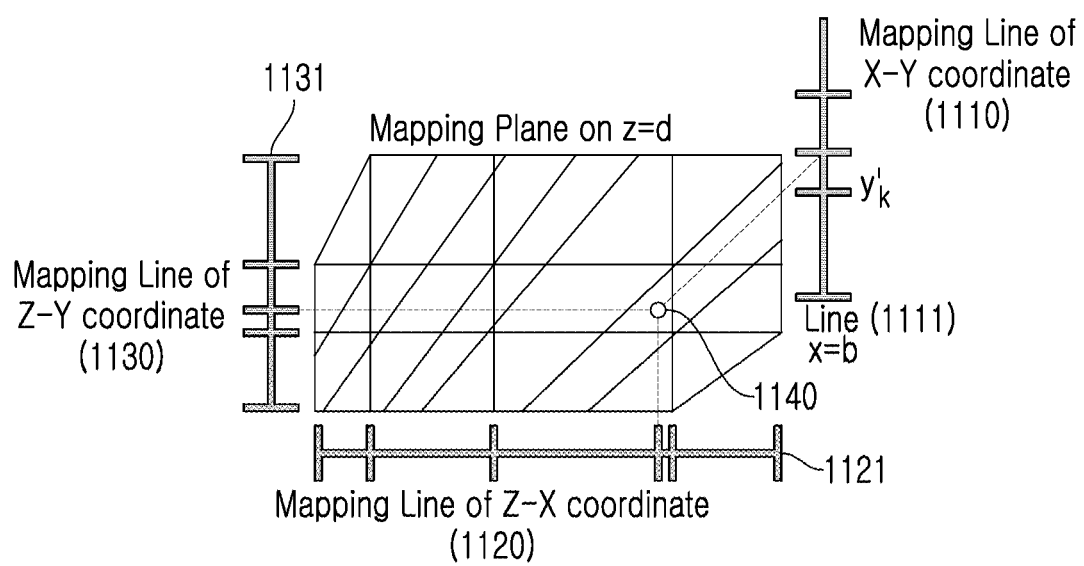
FIG. 11 is a diagram showing that to determine a super ray using a mapping plane in a 3-D plane and to determine a super ray using a mapping line in three 3-D planes are identical in accordance with an embodiment of the present invention.

FIG. 11 is a diagram showing that to determine a super ray using a mapping plane in a 3-D plane and to determine a super ray using a mapping line in three 3-D planes are identical in accordance with an embodiment of the present invention.

Referring to FIG. 11, a method of extending the generation of a super ray to the 3-D may include two methods of determining/generating a super ray using a mapping plane in the 3-D and determining/generating a super ray using mapping planes in three 2-D planes. In this case, to generate a super ray by generating mapping lines 1111, 1121 and 1131 in three 2-D planes (X-Y, Z-X and Z-Y) 1110, 1120 and 1130, respectively, may be more efficient than to generate a super ray using a mapping plane in the 3-D.

In FIG. 11, a grid point 1140 may be a grid point corresponding to the same segment in all of the mapping lines in the three 2-D planes 1110, 1120 and 1130.

Figure 12:
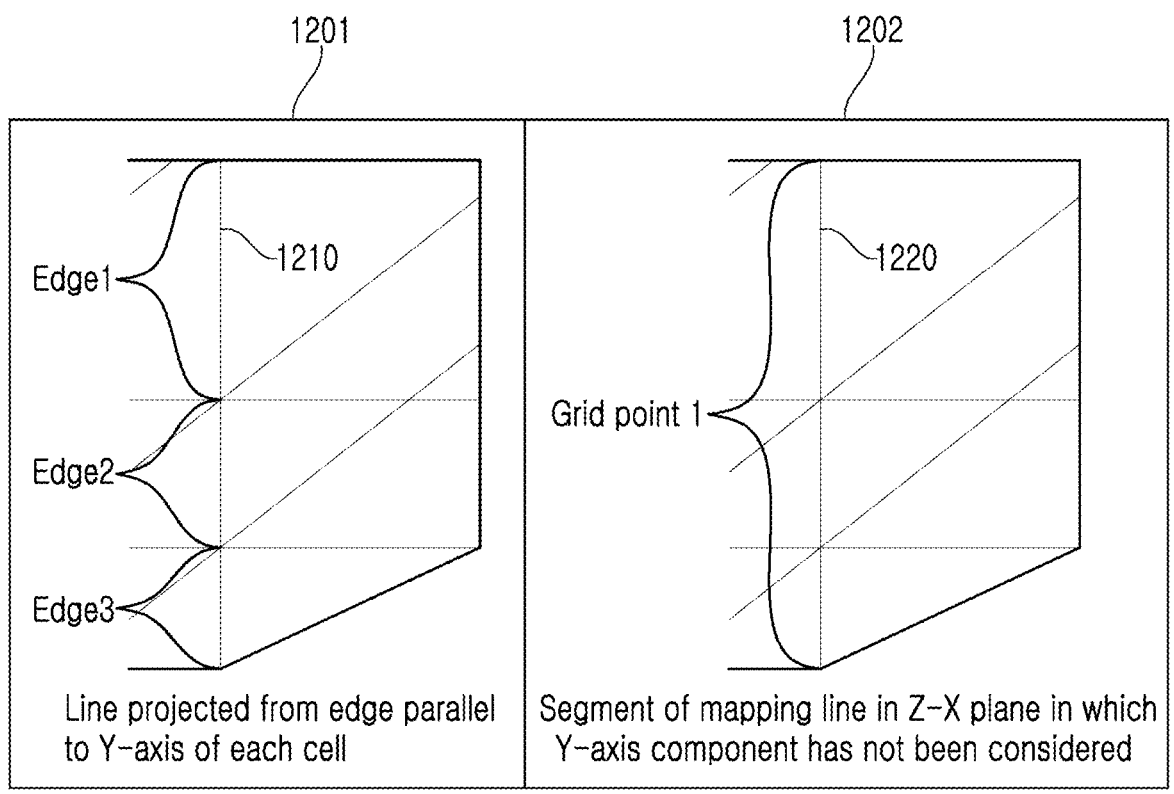
FIG. 12 is a diagram provided to describe a reason why it is more efficient to generate a super ray by generating a mapping line in each dimension in accordance with an embodiment of the present invention.

FIG. 12 is a diagram provided to describe a reason why it is more efficient to generate a super ray by generating a mapping line in each dimension in accordance with an embodiment of the present invention.

A process of generating the 2-D three mapping planes may be faster than a process of generating one 3-D mapping plane. Furthermore, the calculation time of a process of grouping rays as a super ray by mapping the rays may be the same.

Referring to FIG. 12, if line segments 1210 and 1220 above a mapping plane are to be computed, referring to 1201, the line segment 1210 may be computed by mapping/projecting the edges of a cell to a mapping plane in the 3-D. In this case, a total of three edges may be considered. 1202 is a process identical with a process of computing the segment of a mapping line in the Z-X plane. The line segment 1220 may be computed by considering a total of one grid point. That is, in the process of computing lines for dividing each region in a mapping plane, there is a difference between the case of 1201 (i.e., if one mapping plane is generated in the 3-D) in which three edges need to be considered and the case of 1202 (i.e., if three mapping planes are generated in the 2-D) in which one grid point needs to be considered. Accordingly, to generate a super ray by computing the mapping lines in the three lower planes X-Y, Z-X and Z-Y may be more efficient due to such a difference.

In the present invention, an occupancy map can be efficiently updated because point clouds traversing the same cell set as a super ray are also updated when point clouds corresponding to the super ray are updated. That is, the update time can be reduced because the traversing time and the update time are reduced.

The methods according to the embodiments may be implemented in the form of program instructions that can be executed by a variety of computer means, and may be stored in a computer-readable storage medium. The computer-readable storage medium may include program instructions, a data file, and a data structure solely or in combination. The program instructions that are stored in the medium may be designed and constructed particularly for the present invention, or may be known and available to those skilled in the field of computer software. Examples of the computer-readable storage medium include magnetic media such as a hard disk, a floppy disk and a magnetic tape, optical media such as CD-ROM and a DVD, magneto-optical media such as a optical disk, and hardware devices particularly configured to store and execute program instructions, such as ROM, RAM, and flash memory. Examples of the program instructions include not only machine language code that is constructed by a compiler but also high-level language code that can be executed by a computer using an interpreter or the like.

As described above, although the embodiments have been described in connection with the limited embodiments and the drawings, a person having ordinary skill in the art may modify and change the embodiments in various ways from the description. For example, proper results may be achieved although the aforementioned descriptions are performed in order different from that of the described method and/or the aforementioned elements, such as the system, configuration, device and circuit, are coupled or combined in a form different from that of the described method or replaced or substituted with other elements or equivalents.

Accordingly, other implementations, other embodiments, and the equivalents of the claims belong to the scope of the claims.

What is claimed is:

1. A method of updating an occupancy map for a robotic system, the occupancy map comprising a plurality of cells arranged in a grid, the occupancy map representing occupancy probability at locations in the robotic system environment corresponding to cells of the occupancy map, the method comprising the steps of:
obtaining, by a sensor within the robotic system, sensor measurements of objects in the environment of the robotic system;
associating the sensor measurements as a plurality of point clouds, wherein each point cloud comprises a plurality of sensor measurements;
converting a sensor coordinate system of the point clouds into a coordinate system corresponding to the occupancy map;
selecting a first cell from the plurality of cells, the first cell containing point clouds associated with sensor measurements of objects at a corresponding location in the occupancy map;

generating a seed frustum from a sensor origin to the first cell, the seed frustum defined by line segments extending from the sensor origin to grid points of the first cell, wherein all points clouds of the first cell are within the seed frustum;

generating an initial mapping line extending from a grid point of the first cell at a first line segment of the seed frustrum along an edge of the first cell to an intersection with a second line segment of the seed frustrum;

dividing the seed frustum into sub-frustums, the sub-frustums defined by line segments extending from the sensor origin through grid points within the seed frustrum, wherein the sub-frustum line segments divide the initial mapping line into a plurality of segment sections;

associating portions of the point clouds of the first cell with a segment section of the plurality of segment sections, wherein the portion of point clouds associated with each segment section are within the corresponding sub-frustum, and wherein the portion of point clouds associated with the segment section comprises at least a first and second point cloud;

projecting a first ray from the sensor origin to the first point cloud of the portion of point clouds associated with a first segment section, and determining the first ray to be a super ray, wherein the super ray passes through the same set of cells of the plurality of cells as the projections of rays from the sensor origin to each point cloud in the portion of point clouds associated with the first segment section;

storing the first point cloud at a storage unit within the robotic system; and updating the occupancy map by updating the first cell based on the first point cloud, and not updating the first cell based on the second point cloud.

2. The method of claim 1, wherein updating the occupancy probability of the first cell is weighted based on the number of point clouds represented by the super ray.

3. The method of claim 1, wherein updating the occupancy map includes updating the occupancy probability of the first cell based on an occupancy state of the first cell.

4. The method of claim 1, wherein updating the occupancy map includes updating the occupancy probability of cells of the occupancy map through which the super ray passes from the sensor origin to the first cell as free state cells.

5. The method of claim 1, wherein the updating of the occupancy map includes updating the occupancy map according to a clamping policy for limiting the change of occupancy state based on minimum and maximum bounds.

6. The method of claim 1, wherein the occupancy map comprises an octree map based on a uniform grid size or irregular grid size.

7. The method of claim 1, wherein the sensor measurements of objects in the environment of the robotic system are sensed for a specific time frame or at predetermined times.

8. The method of claim 1, wherein updating the occupancy map includes updating one or more additional cells associated with one or more corresponding super rays projected from the sensor origin to a point cloud within a portion of the point clouds associated with each of the plurality of segment sections.

9. The method of claim 8, wherein the updating of the one or more additional cells includes processing the corresponding sub-frustums of each of the plurality of segment sections in an x-axis, y-axis, or z-axis processing direction.

10. The method of claim 1, wherein the occupancy map comprises a three-dimensional (3D) representation of cells as bound volumes at locations in the robotic system environment, and wherein the sensor measurements associate the plurality of point clouds within the first cell as a bound volume.

11. The method of claim 10, wherein the determining the first ray to be a super ray includes generating a seed frustrum, generating an initial mapping line, and dividing the initial mapping line into segment sections for each of three two-dimensional (2D) planes by projecting grid points of the first cell onto each of a Y-Z plane, a Z-X plane, and an X-Y plane.

12. The method of claim 11, wherein the determining the first ray to be a super ray further includes determining that a point cloud is associated with the same segment section of each of the two-dimensional planes, and updating the first cell based on the super ray.

13. A system for updating an occupancy map for a robotic system, the occupancy map comprising a plurality of cells arranged in a grid, the occupancy map representing occupancy probability at locations in the robotic system environment corresponding to cells of the occupancy map, comprising:

a sensor within the robotic system to sense point clouds in a surrounding environment representing objects around the robotic system, wherein each point cloud comprises a plurality of points;

at least one processor to execute received instructions of a program code stored in a non-transitory medium, wherein the received instructions configure the at least one processor to include:

a mapping line generation unit configured to:
convert a sensor coordinate system of the point clouds into a coordinate system corresponding to the occupancy map;

select a first cell from the plurality of cells, the first cell containing point clouds associated with sensor measurements of objects at a corresponding location in the occupancy map;

generate a seed frustum from a sensor origin to the first cell, the seed frustum defined by line segments extending from the sensor origin to grid points of the first cell, wherein all points clouds of the first cell are within the seed frustum;

generate an initial mapping line extending from a grid point of the first cell at a first line segment of the seed frustrum along an edge of the first cell to an intersection with a second line segment of the seed frustrum;

divide the seed frustum into sub-frustums, the sub-frustums defined by line segments extending from the sensor origin through grid points within the seed frustrum, wherein the sub-frustum line segments divide the initial mapping line into a plurality of segment sections;

associate portions of the point clouds of the first cell with a segment section of the plurality of segment sections, wherein the portion of point clouds associated with each segment section are within the corresponding sub-frustum, and wherein the portion of point clouds associated with the segment section comprises at least a first and second point cloud;

a super ray generation unit configured to:
project a first ray from the sensor origin to the first point cloud of the portion of point clouds associated with a first segment section, and determine the first ray to be a super ray, wherein the super ray passes through the same set of cells of the plurality of cells as the projections of rays from the sensor origin to each point cloud in the portion of point clouds associated with the first segment section;

a storage unit configured to store a point cloud of the portion of the point clouds, to which the super ray extends, at a storage unit within the robotic system; and a map update unit configured to update the occupancy map by updating the first cell based on the first point cloud, and not updating the first cell based on the second point cloud.

14. The system of claim 13, wherein updating the occupancy probability of the first cell is weighted based on the number of point clouds represented by the super ray.

15. The system of claim 13, wherein updating the occupancy map includes updating the occupancy probability of the first cell based on an occupancy state of the first cell.

16. The system of claim 13, wherein updating the occupancy map includes updating the occupancy probability of cells of the occupancy map through which the super ray passes from the sensor origin to the first cell as free state cells.

17. The system of claim 13, wherein the updating of the occupancy map includes updating the occupancy map according to a clamping policy for limiting the change of occupancy state of based on minimum and maximum bounds.

18. The system of claim 13, wherein the occupancy map comprises an octree map based on a uniform grid size or irregular grid size.

19. The system of claim 13, wherein the sensor measurements of objects in the environment of the robotic system are sensed for a specific time frame or at predetermined times.

20. The system of claim 13, wherein updating the occupancy map includes updating one or more additional cells associated with one or more corresponding super rays projected from the sensor origin to a point cloud within a portion of the point clouds associated with each of the plurality of segment sections.

21. The system of claim 20, wherein the updating of the one or more additional cells includes processing the corresponding sub-frustums of each of the plurality of segment sections in an x-axis, y-axis, or z-axis processing direction.

22. The system of claim 13, wherein the occupancy map comprises a three-dimensional (3D) representation of cells as bound volumes at locations in the robotic system environment, and wherein the sensor measurements associate the plurality of point clouds within the first cell as a bound volume.

23. The system of claim 22, wherein the determining the first ray to be a super ray includes generating a seed frustrum, generating an initial mapping line, and dividing the initial mapping line into segment sections for each of three two-dimensional (2D) planes by projecting grid points of the first cell onto each of a Y-Z plane, a Z-X plane, and an X-Y plane.

24. The system of claim 23, wherein the determining the first ray to be a super ray further includes determining that a point cloud is associated with the same segment section of each of the two-dimensional planes, and updating the first cell based on the super ray.

* * * * *